UNITED STATES PATENT OFFICE.

HENRI RAYMOND VIDAL, OF PARIS, FRANCE.

PROCESS OF MAKING CARBOXYLATED PRODUCTS OF TRIPHENYLMETHANE.

SPECIFICATION forming part of Letters Patent No. 603,300, dated May 3, 1898.

Application filed July 24, 1897. Serial No. 645,859. (Specimens.) Patented in France February 24, 1897, No. 264,384, and in England March 2, 1897, No. 5,535.

*To all whom it may concern:*

Be it known that I, HENRI RAYMOND VIDAL, of Paris, France, have invented certain new and useful Improvements in Coloring-Matters, (for which I have obtained patents in Great Britain, No. 5,535, dated March 2, 1897, and in France, No. 264,384, dated February 24, 1897,) which improvements are fully set forth in the following specification.

This invention relates to the production of carboxylated products—namely, mono and di carboxylated products—derived from amido or phenolic compounds and amids and phenols of triphenylmethane. I obtain these products in the following manner: I heat for twenty-four hours in an oil-bath, in a caldron of enameled cast-iron, salicylic acid, thirteen kilograms; phenol, twenty kilograms; oxalic acid, twenty-five kilograms; sulfuric acid, fifteen kilograms. The product thus obtained is poured into ten times its weight of water and treated by a current of steam, which carries off the excess of phenol. The water is decanted and the product is purified by being dissolved in a solution of its weight of metabisulfite of soda diluted with ten times its weight of water. The coloring-matter is precipitated from the metabisulfite solution by sulfuric acid. The sulfurous acid is driven off by ebullition. The coloring-matter is separated by filtration and desiccated.

This product constitutes the monocarboxylated derivative of triphenolcarbinol.

If in the preceding reaction I employ twenty-five kilos of salicylic acid instead of thirteen kilos, I obtain as a final product the dicarboxylated derivative of triphenolcarbinol.

The carboxylated group is situated in each nucleus in the ortho position with relation to the phenolic group.

The formula of the monocarboxylated derivative is

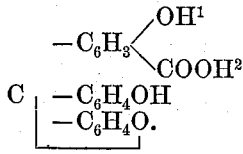

The formula of the dicarboxylated derivative is

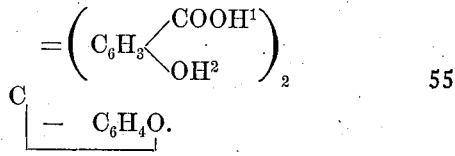

By employing metaoxybenzoic acid I am able to obtain products in which the carboxylated group occupies the meta position with respect to the phenolic group instead of the ortho position.

Oxy-beta-naphthoic acid reacts under the same conditions as salicylic and metaoxybenzoic acids, resulting in the corresponding mono and di carboxyl derivatives of phenolnaphtholcarbinol.

If I substitute for the oxycarboxylated products amidocarboxylated products, such as ortho and meta amidobenzoic acids, proceeding in the same way, I obtain mono and di carboxyl products in which one or two of the three hydroxyls of triphenolcarbinol are replaced by the amido group situated in the ortho or meta position with respect to the carboxyl group. The mono and di carboxylated products constitute in the acid state products of a light-yellow color and in the state of salts products of a very bright scarlet red.

In all the preceding reactions I may substitute for sulfuric and oxalic acids, as condensing agents, chlorid of zinc and formic acid.

Having thus fully described my invention, what I claim as new, and desire to secure by Letters Patent, is—

The process of making mono and di carboxylated products derived from phenolic and amidated compounds of triphenylmethane, by heating a mixture of phenol and the compound of triphenylmethane in presence of condensing agents such as oxalic and sulfuric acid, substantially as described.

In testimony whereof I have signed this specification in the presence of two subscribing witnesses.

HENRI RAYMOND VIDAL.

Witnesses:
 EDWARD P. MACLEAN,
 ANTOINE ROUSSANNER, Jr.